United States Patent [19]

Darboven, Jr.

[11] 3,860,925

[45] Jan. 14, 1975

[54] VELOCITY-ALTIMETER FREQUENCY-MODULATION CONTINUOUS-WAVE DOPPLER SYSTEM

[75] Inventor: Ernest F. Darboven, Jr., Oak Ridge, N.J.

[73] Assignee: The Singer Company, Little Falls, N.J.

[22] Filed: Jan. 9, 1974

[21] Appl. No.: 431,904

[52] U.S. Cl. .................................. 343/9, 343/12 A
[51] Int. Cl. .............................................. G01s 9/46
[58] Field of Search ......................... 343/9, 12 A, 14

[56] References Cited
UNITED STATES PATENTS 3,150,365  9/1964  Wimberly et al. ...................... 343/9
3,334,344  8/1967  Colby, Jr. .......................... 343/9 X Primary Examiner—T. H. Tubbesing
Attorney, Agent, or Firm—T. W. Kennedy

[57] ABSTRACT

A restricted range velocity-altimeter frequency-modulation continuous-wave Doppler system is provided which utilizes relatively simple, inexpensive and straightforward circuitry in its altimeter module. The altimeter module is effective in producing altitude outputs as a function of signal amplitudes, rather than signal phase angles as is usual in the prior art. Moreover, costly calibration circuits are obviated in the altimeter module by using a post intermediate frequency leakage signal in the determination of zero altitude readings.

9 Claims, 13 Drawing Figures

A. RADIATED SPECTRUM

B. RECEIVED ECHO SPECTRUM

C. RECEIVER OUTPUT

D. POST IF OUTPUT

E. FREQUENCY DOUBLER OUTPUT (ALTIMETER MODULE)

PRIOR ART

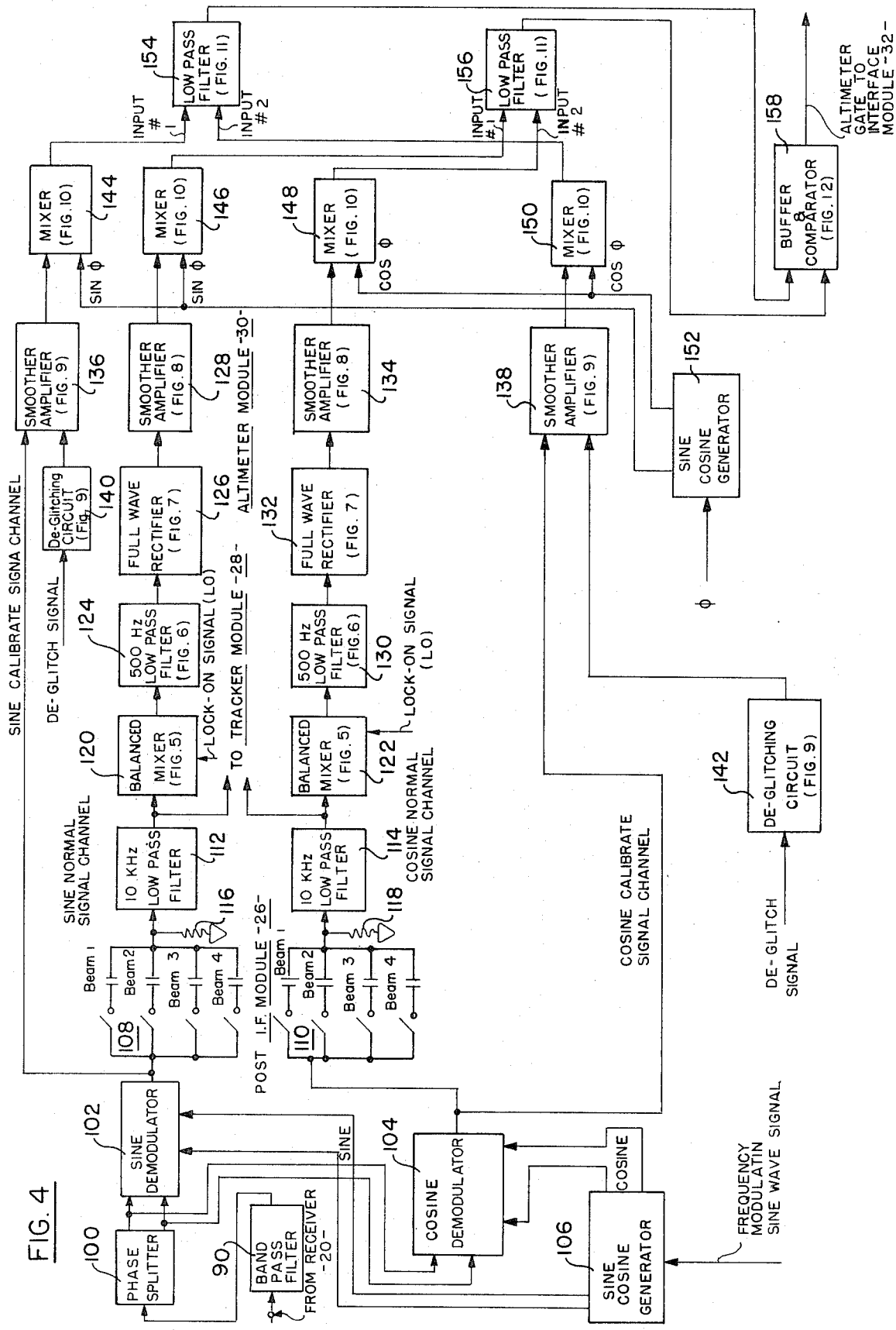

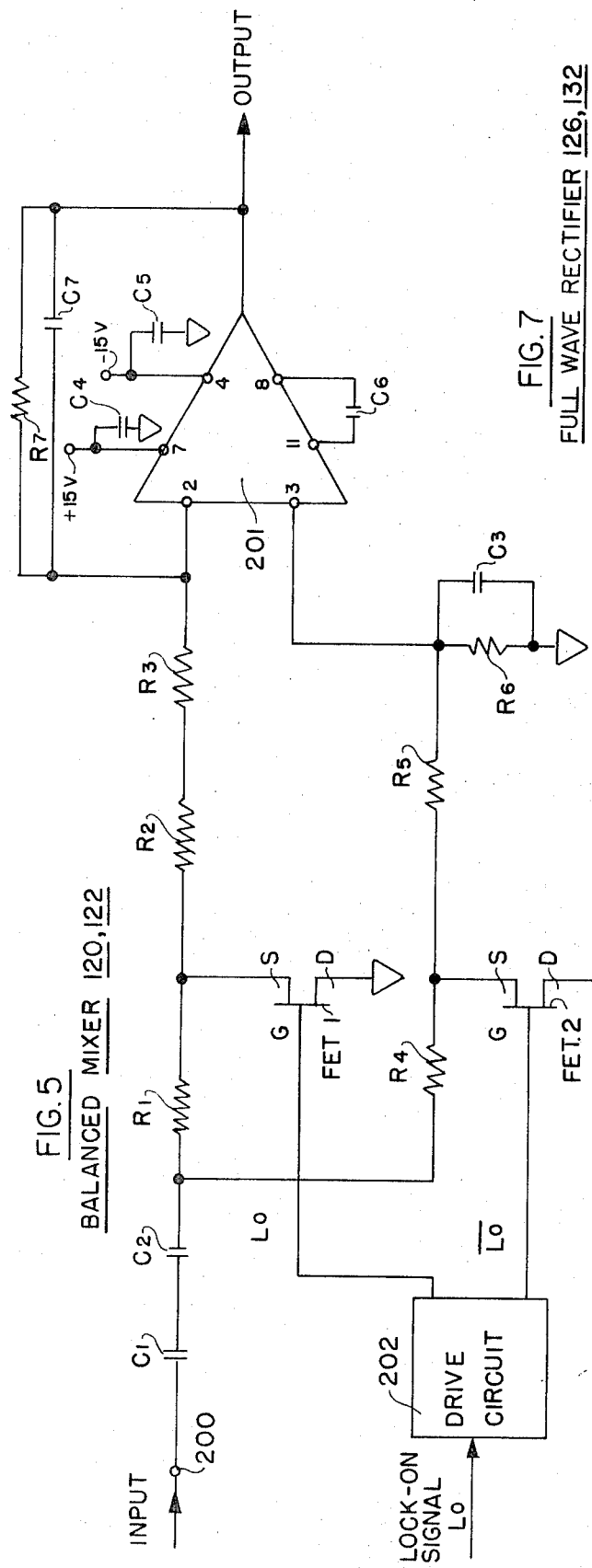
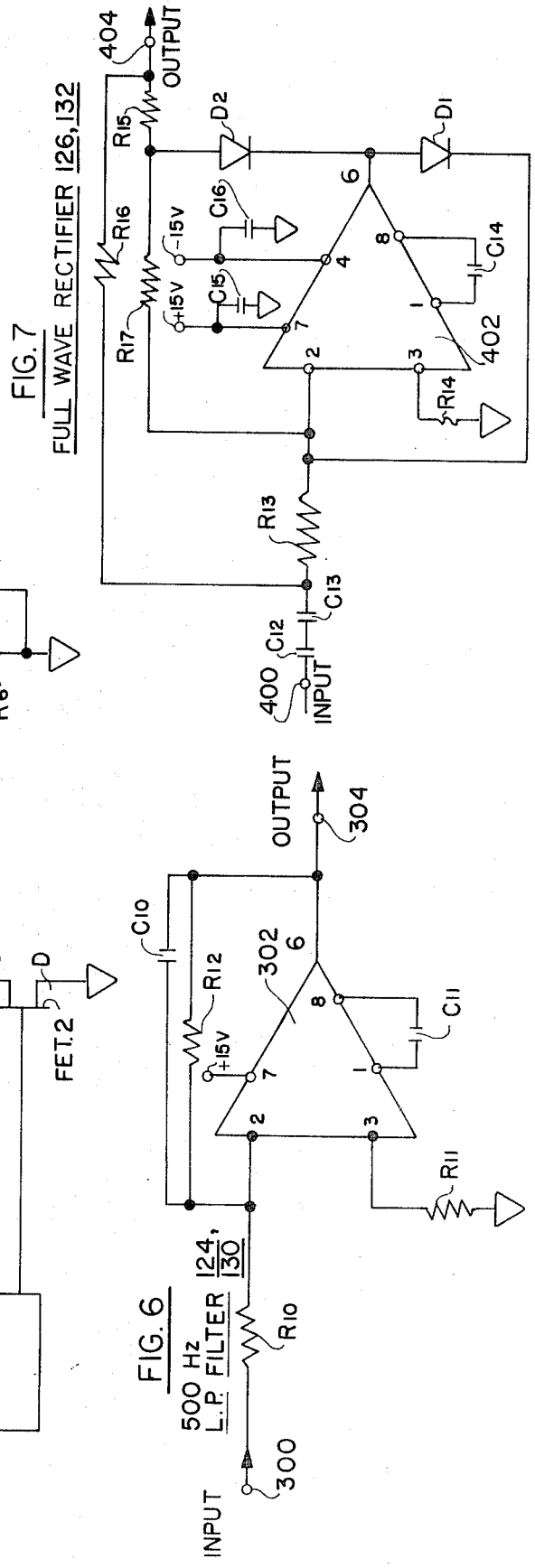

CALIBRATE SMOOTHER AMPLIFIER 136,138

SIGNAL SMOOTHER AMPLIFIER 128,134

MIXER 144,146,148,150

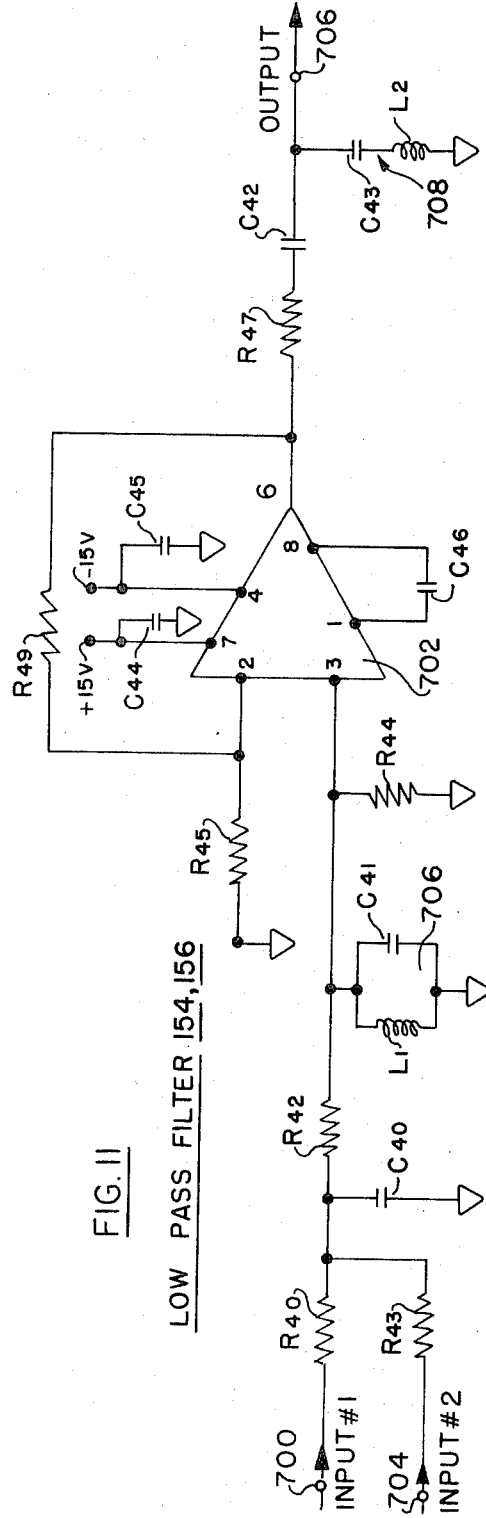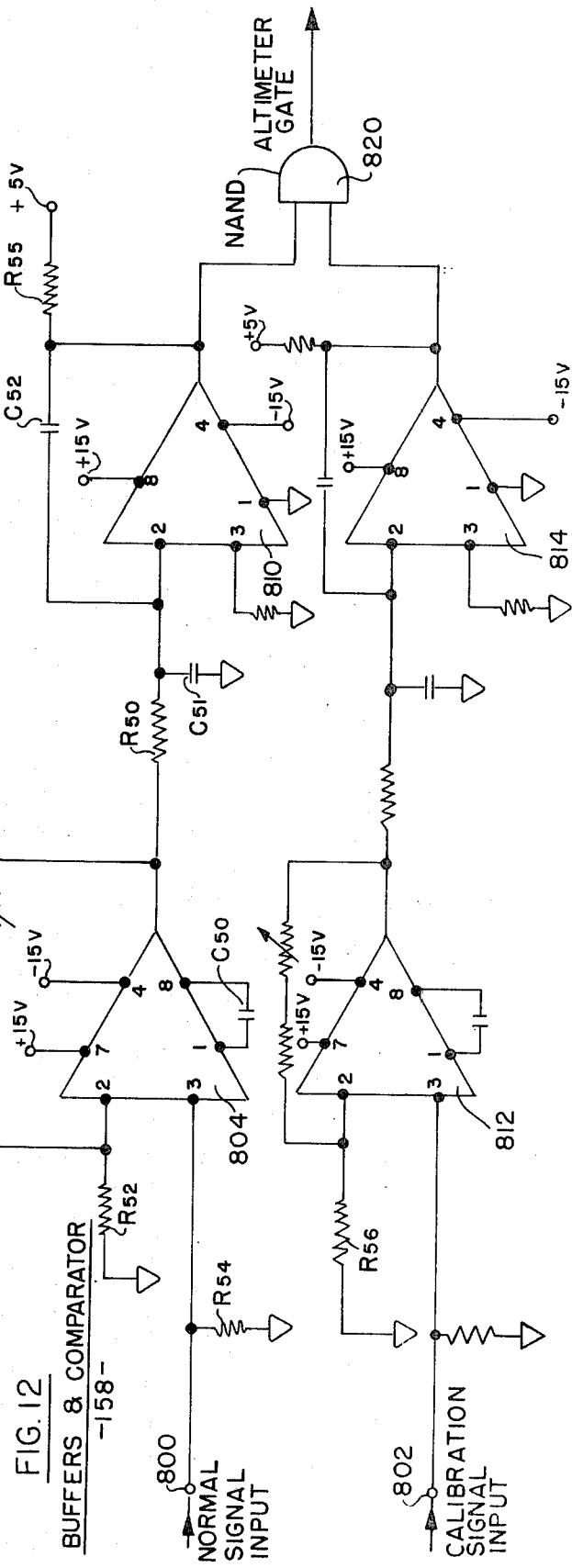
FIG. 11
LOW PASS FILTER 154,156
FIG. 12
BUFFERS & COMPARATOR -158-

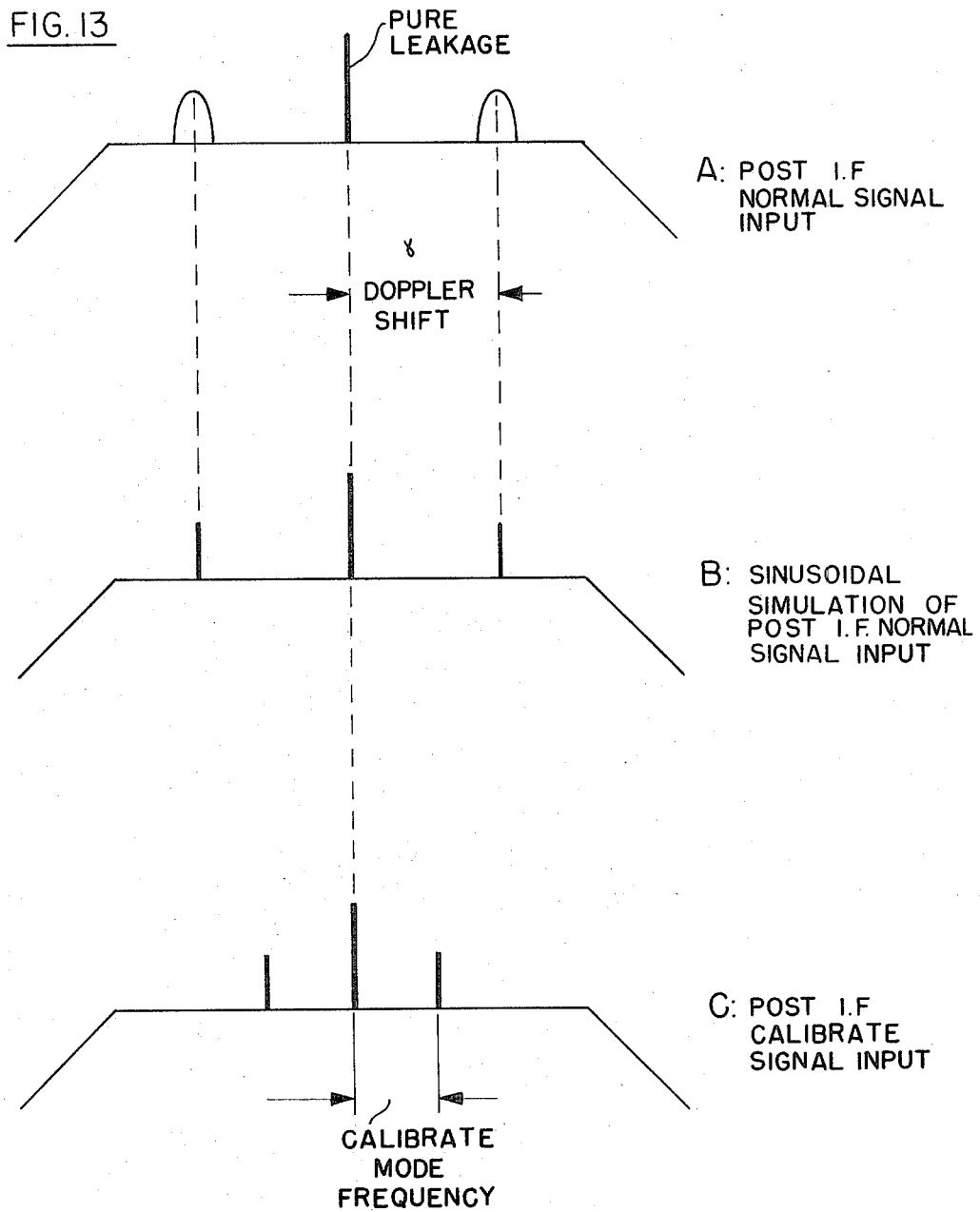

VELOCITY-ALTIMETER FREQUENCY-MODULATION CONTINUOUS-WAVE DOPPLER SYSTEM

BACKGROUND OF THE INVENTION

Airborne Doppler radar systems are used to determine the velocity of a vehicle relative to the earth for navigational or other purposes. The prior art Doppler radar system usually consists of an antenna unit which includes a transmitter-receiver assembly, an antenna array, and appropriate switching and control circuitry; and an electronic unit which usually includes a post intermediate frequency module, a frequency tracker module, an altimeter module, and related circuitry.

The Doppler frequency shift ($\Delta f$) is an extremely small percentage of the trasmitter frequency $f$, and is given by the equation:

$$\Delta f = 2Vf/C \cos \gamma \qquad (1)$$

Where:
 V is relative speed;
 C is speed of signal propagation; and
 $\gamma$ is the angle between the velocity vector of the vehicle and direction of a signal propagation.

Frequency-modulated continuous-wave Doppler systems are known, in which the sidebands of the detected beat between the echo and transmitted signal are used, and in which the modulator index rate, and the sideband order, are chosen such that echos from nearby objects are rejected, while those from distant objects are accepted. The system of the present invention, as will be described, is concerned with the provision of an improved altimeter module in a frequency-modulated continuous-wave Doppler radar system.

The system of the invention extracts altimeter data from the frequency-modulated continuous-wave Doppler system by means of relatively simple circuitry and equipment, and at minimal cost. In the system to be described, and as mentioned above, altitude determination is made from amplitude of the echo signal, rather than by its phase angle with the transmitted signal, so that the altitude determination may be made in a more straightforward and simpler manner, than is the case in the prior art systems. In addition, and as also mentioned above, post intermediate frequency leakage is used as a zero altitude calibration signal, so as to eliminate costly signal calibration circuits.

BRIEF DESCRIPTION OF THE DRAWINGS

FIG. 4 is a block diagram of an altimeter module system which has been modified to include the concepts of the invention in one of its embodiments;

FIGS. 5–12 are more detailed diagrams of certain of the components of the modified altimeter system of FIG. 4; and FIG. 13 contains three graphical representations of the post intermediate frequency outputs derived from the radar system for use in the prior art altimeter module.

DETAILED DESCRIPTION OF THE ILLUSTRATED EMBODIMENT

Figure 1:
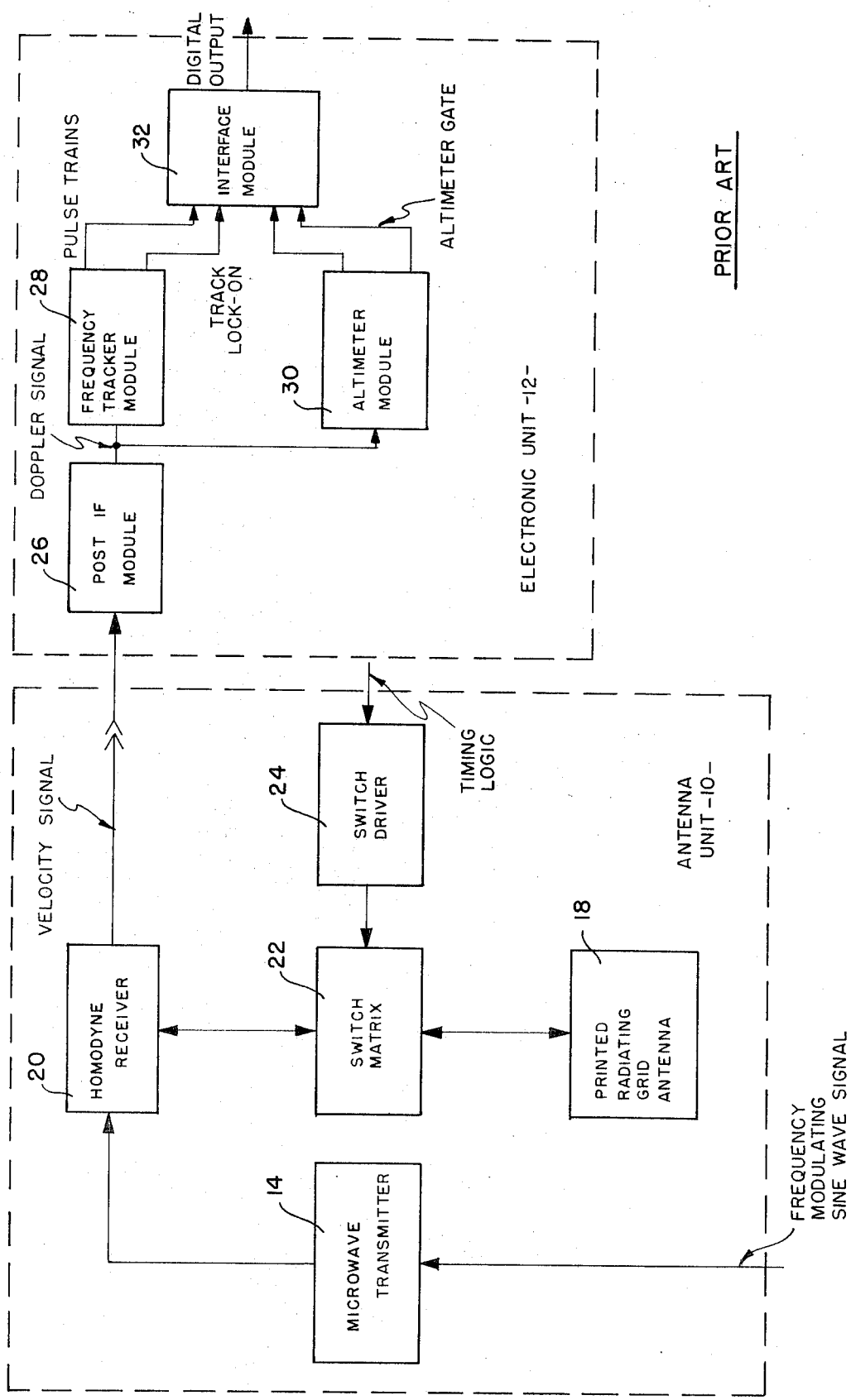
FIG. 1 is a simplified functional block diagram of a prior art continuous-art frequency-modulated Doppler radar system which incorporates an altimeter module which may be modified to incorporate the concepts of the invention.

As shown in FIG. 1, the typical prior art frequency-modulated continuous-wave Doppler radar navigational system includes an antenna unit 10 and an electronic unit 12. The antenna unit includes a microwave transmitter 14. The transmitter 14 may be a Gunn diode oscillator, and it may be frequency-modulated by a sine-wave signal derived from an appropriate signal generating source. The resulting frequency-modulated continuous-wave output from the transmitter 14 is applied sequentially to three antenna ports, represented by the block 18, through conventional stripline beam switches in a homodyne receiver 20, and through a switch matrix 22 which is driven by a switch driver 24.

Figure 2:
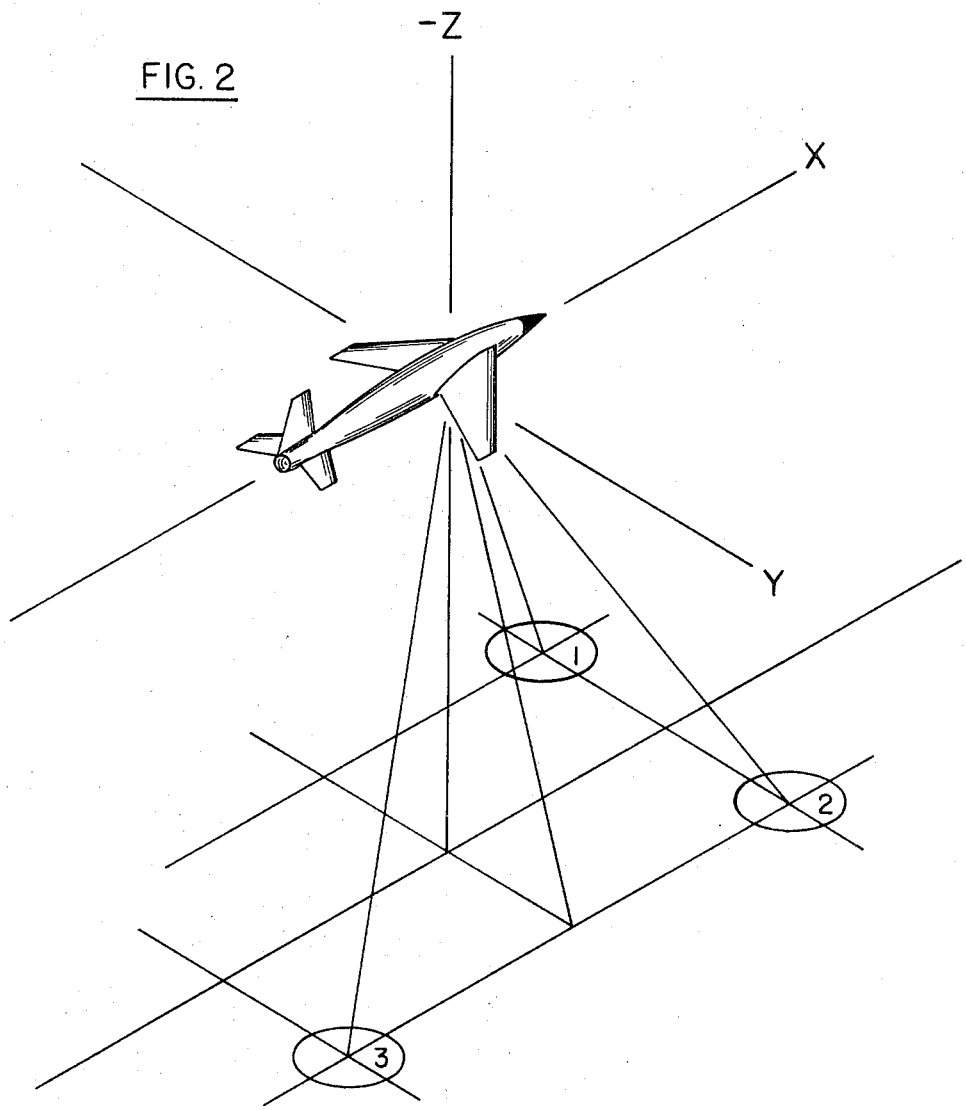
FIG. 2 is a diagram illustrating a three-beam antenna arrangement for use in the prior art system of FIG. 1.

The antenna 18 may consist of a single known type of radiating grid array which is used for both transmitting and receiving. For example, the antenna may be constructed of two parallel plates, specifically a ground plate and the radiating grid structure, fed by two slotted waveguide feed arrays. By sequentially switching the transmitter signal to the three antenna ports, three non-coplanar beams are radiated and received by the single antenna, as illustrated in FIG. 2.

Figure 3:
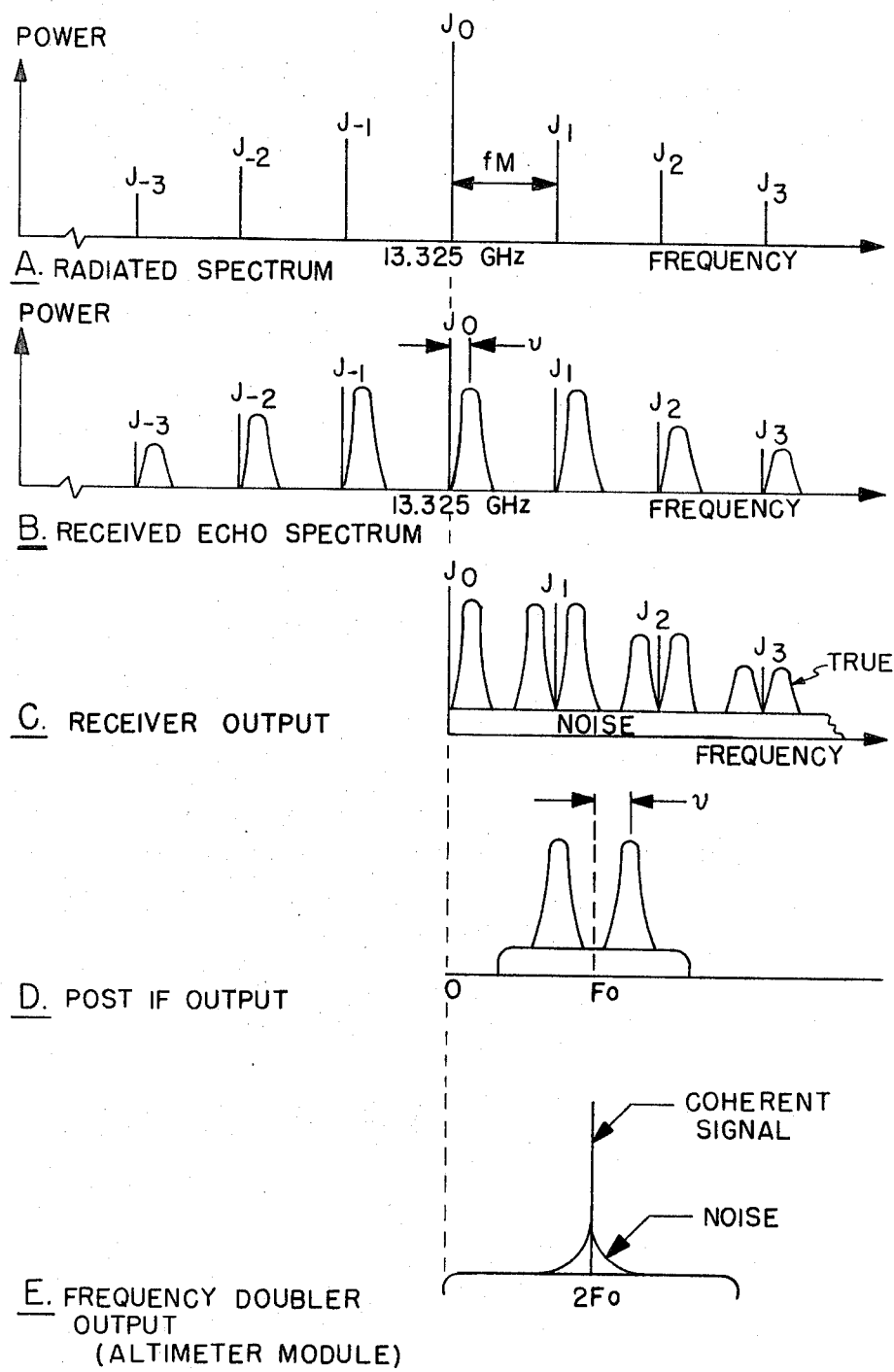
FIG. 3 contains a series of waveform representations of the signal spectrum at various points in the prior art system of FIG. 1.

The radiated signal, as shown in the waveform "A" of FIG. 3 consists of a spectrum of discrete frequencies, centered about the carrier frequency ($J_o$), and separated by multiples of the modulation frequency ($f_m$). The radiated energy is backscattered from the earth's surface with the carrier and each of the sidebands being frequency-shifted as a function of the relative velocity between the aircraft and the earth's surface. The received echo spectrum with an arbitrary Doppler frequency shift is represented by the waveform "B" of FIG. 3. In addition, a small amount of the transmitted signal is reflected from the antenna into the receiver resulting in leakage signals shown as discrete frequency lines in FIG. 3. The spectra at the carrier and at each of the sidebands are frequency displaced from the transmitted frequencies by V, which represents the Doppler shift. The symbols $J_0$, $J_1$, $J_2$, etc. represent the sidebands, and these symbols are used because the contents of the received energy can be described mathematically in terms of Bessel Functions.

The returned echo signal is mixed with a portion of the transmitted signal in a balanced radio frequency mixer in the homodyne receiver 20, and the receiver translates the $J_0$ terms down to direct current, as shown by the waveform C of FIG. 3. The Doppler signals from the sidebands below the carrier frequency are folded over and appear as mirror images to the true signals. This double sideband data is used to measure the phase shift information, and hence to measure altitude in the the prior art systems. The signals are then amplified in the homodyne receiver and are introduced to a post intermediate frequency module 26 in the electronic unit 12.

The inputs to the post intermediate frequency module 26 in the usual prior art system are presented by the curves of FIG. 13, and they comprise normal signal width leakage (Curve A); sinusoidal simulation of the normal signal (Curve B); and the calibrate signal (Curve C). The altimeter operation of the present invention will be described in conjunction with the sinusoidal simulation of the normal signal (Curve B).

The major function of the post intermediate frequency module 26 in the prior art system is to remove the leakage ($J_1$); and leakage removed by the post intermediate frequency module leaves the following signals at the output of that module: (a) for the normal signal phase:

$$f(t) = [A \cos 2\pi (f_m - \gamma)t + \theta_2] + [A \cos 2\pi (f_m + \gamma)t + \theta_2] \qquad (2)$$

Where:
$\theta_2$ is the altitude phase shift of the echo signal; and
$\gamma$ is Doppler shift.

For the "calibrate phase" the signal will be presented as:

$$f(t) = [B \cos 2\pi(f_m - f_{cal})t + \theta_1] + [B \cos 2\pi(f_m + f_{cal})t + \theta_1]. \qquad (3)$$

Where:
$\theta_1$ is the calibrate phase; and
$f_{cal}$ is a calibration modulating signal.

In the prior art altimeter system, as represented by Equation 3, the calibration modulating signal ($f_{cal}$) is generated by a separate module and introduced into the system of the antenna unit 10 of FIG. 1. In the prior art altimeter system, frequency doubling is used to produce a discrete signal at $2f_m$. The phase difference between the calibrate signal and normal signal at $2f_m$ is then $2(\theta_2 - \theta_1)$. The value $2(\theta_2 - \theta_1)$ is proportional to altitude, and the function of the prior art altimeter module is to determine that value. The prior art altimeter system, however, is somewhat complex since it requires additional radio frequency circuitry for the generation of the calibration modulating signal ($f_{cal}$). Such a calibration modulating signal is not required in the system of the present invention.

A bandpass filter in the post intermediate frequency module 26 selects the $J_1$ sideband. In the next stage of the post intermediate frequency module, the leakage component ($J_1$) is eliminated by demodulating the signal in a sine-cosine manner and rejecting the resulting zero speed leakage term with a switched capacitor filtering technique.

The desired signals are then remodulated in the prior art system in the post intermediate frequency 26 around a fixed offset frequency ($f_o$), and the resulting time-sequenced spectra associated with the three beams are fed to a frequency tracker module 28 and to an altimeter module 30. The spectrum of one such beam is shown by the waveform D in FIG. 3. As will be described, the system of the present invention does not require the remodulation step, and errors which arise in the prior art systems from the injection of a remodulating keying signal are obviated in the system of the invention.

The prior art frequency tracker module 28 consists of a single, conventional sine-cosine tracking loop which is time shared between the three beams. Since the aircraft travels only in a forward direction, the tracking loops are implemented to track only the upper side band of the double side banded signal which is produced when either the fore or aft beams are radiating. When a Doppler shifted signal is presented at the output of the receiver 20, the frequency tracker 28 automatically acquires the signal and tracks the center frequency of the Doppler spectrum. The outputs from the frequency tracker module 28 are time sequenced pulse trains whose frequencies are proportional to the Doppler shift in each of the three beams. The time multiplexed pulse trains are transmitted to an interface module 32 for processing into the desired orthogonal components of velocity.

The output of the post intermediate frequency module 26 is also fed into the altimeter module 30 in the prior art system. The two signals shown in the waveform "D" of FIG. 3 are actually mirror images since one of them was generated during the folding process in the first mixing operation in the antenna unit 10. By processing this signal in a subsequent frequency doubler stage in the prior art altimeter module 30, the two coherent mirror images result in a single spike of waveform "E" of FIG. 3 at a frequency double the center frequency ($2f_0$), and with the Doppler fluctuation noise eliminated.

In the prior art altimeter module, the phase of the signal of waveform "E" of FIG. 3 is compared with a reference signal which compensates for phase delays in the receiver. The output from the altimeter module is a gate of duration proportional to the altitude of the aircraft, and this gate is fed to the interface module 32.

The interface module 32 receives the time gate from the altimeter module 30, and three pulse trains from the frequency tracker module 28, and converts them into the proper binary format to supply a digital output to the navigation computer of the aircraft.

The post intermediate frequency module 26, and the altimeter module 30, modified in accordance with one embodiment of the invention, are shown in some detail in the block diagram of FIG. 4. As illustrated, the post intermediate frequency module 26 includes a phase splitter 100 which receives its input from the receiver 20 of FIG. 1 through a bandpass filter 90. The phase splitter 100 is connected to a sine demodulator 102 and to a cosine demodulator 104. The sine-cosine generator 106, which is synchronized with the frequency modulating sine-wave signal applied to the transmitter 14, supplies the sine and cosine demodulating signals to the respective demodulators 102 and 104. The outputs of the demodulators 102 and 104 are connected to appropriate switching matrices 108 and 110. The outputs of the respective switching matrices are introduced to corresponding 10 KHz filters 112 and 114, the inputs of which are connected to respective grounded resistors 116 and 118.

The output of the low pass filter 112 constitutes the normal sine signal channel, and is connected to a balanced mixer 120. The output of the low-pass filter 114 constitutes the normal cosine signal channel, and is connected to a balanced mixer 122. The balanced mixers 120, 122 also receive a lock-on signal ($L_o$) from the frequency tracker module 28. The outputs of the filters 112 and 114 are also connected to the frequency tracker module 28 of FIG. 1.

The balanced mixer 120 in the normal sine signal channel is connected to a 500 Hz low-pass filter 124 which in turn is connected through a full-wave rectifier 126 to a smoother amplifier 128. The balanced mixer 122 in the normal cosine signal channel is connected to corresponding stages represented respectively by the blocks 130, 132 and 134. The sine demodulator 102 is connected by way of a sine calibrate signal channel to a smoother amplifier 136, and the cosine demodulator 104 is connected by way of a cosine calibrate signal channel to a smoother amplifier 138. A de-glitching circuit 140 is connected to the smoother amplifier 136, and a similar de-glitching circuit 142 is connected to the smoother amplifier 138.

The smoother amplifiers 136, 128, 134 and 138 are all connected to corresponding mixers 144, 146, 148 and 150. A sine-cosine generator 152 supplies a sine signal (sine $\phi$) to the mixers 144 and 146, and supplies a cos $\phi$ signal to the mixers 148 and 150. The mixers 144 and 150 are connected to a low-pass filter 154, and the mixers 146 and 148 are connected to a low-pass filter 156. The low-pass filters are connected to a buffer and comparator 158 which supplies the altimeter gate signal to the interface 32 in FIG. 1, the gate signal having a duration corresponding to the actual altitude of the aircraft.

In the system of the present invention shown in the block diagram of FIG. 4, the altitude determination is made from relative signal amplitudes in the sine and cosine normal signal channels described above; and leakage (instead of a separate calibrate modulating signal) is used for calibration purposes in the sine and cosine calibrate signal channels to determine zero altitude. In this way, the costly circuits required in the prior art system to generate the calibrate signal are eliminated.

In the system of FIG. 4, the signal from the receiver 20 is passed through a bandpass filter 90 which selects the $J_1$ sideband. The $J_1$ leakage component is then eliminated by demodulating the signal in a sine-cosine manner in the demodulators 102, 104. The zero speed leakage term is then rejected by switched capacitor filters composed of the switching matrices 108, 110 and low-pass filters 112, 114.

The two mixers 120, 122 in the sine-cosine normal signal channels translate the resulting "center" of the Doppler spectrum to direct current, and the succeeding low-pass filters 124, 130 filter out most of the passband background noise, which is an advantage over the prior art systems in which all background noise is processed.

The rectifiers 126 and 132 produce direct current analog output voltages corresponding to the amplitudes of the sine and cosine alternating current signals from the mixers 120 and 122. The amplifiers 128 and 134 smooth the analog voltages, and the outputs from the amplifiers are introduced to the mixers 144 and 148. Similar smoother amplifiers 136 and 138 in the sine and cosine calibrate signal channels introduce their outputs to mixers 144 and 150. The mixers 144, 146, 148 and 150 are controlled by a calibrate-normal signal ($\phi$), so that in one phase ($\theta_2$) the normal sine and cosine signal analog voltages are supplied through the low-pass filters 154 and 156 to the buffer and comparator 158; and in a second phase ($\theta_1$) the calibrate sine and cosine signal analog voltages are applied through the low-pass filters 154 and 156 to the buffer and comparator 158. The buffer and comparator 158 uses these analog voltages to produce the altimeter gate whose duration is a function of the altitude of the aircraft.

Operation of the system of the invention is predicated on the assumption that the $J_1$ leakage signal will have a phase $\theta_1$ corresponding to the calibrate phase described above in conjunction with Equation 3. This assumption is valid since all signal paths for the $J_1$ leakage contributors are short. Thus, if the $J_1$ leakage amplitude is B, then the direct current output of the sine demodulator 102 as applied to the sine calibrate signal channel is B sine $\theta_1$, and the direct current output of the cosine demodulator 104, as applied to the cosine calibrate signal channel is B cos $\theta_1$.

Therefore, the superposition of the outputs of mixers 144, 146 and 148, 150 through the low-pass filters 154 and 156 will result in two sine waves whose phase difference is $\theta_2 - \theta_1$. The processing of these sine waves in the buffer and comparator 158 results in a gate width which is equal to the time delay between the two sine waves which, as stated, is a measure of the altitude of the aircraft. In other words, the mixers 144, 146, 148 and 150, the low-pass filters 154 and 156, and the buffer and comparator 158 represent a means of converting the four direct current analog voltages from the smoother amplifiers 136, 128, 134, 138 into an altitude gate whose duration is proportional to altitude.

Each of the balanced mixers 120 and 122 may take the form shown in FIG. 5. The balanced mixer circuit of FIG. 5 includes an input terminal 200 which is connected through a pair of 6.8 microfarad capacitors C1 and C2, and through three resistors R1, R2 and R3 to the input terminal 2 of an integrated circuit 201 of the type designated LM201. The resistor R1 may have a resistance of 13 kilo-ohms, and the resistors R2 and R3 may each have a resistance of 6.49 kilo-ohms. The lock-on signal $L_O$ derived from the velocity tracker module 28 is applied to an appropriate drive circuit 202 which produces a pair of output signals corresponding to $L_O$ and $\overline{L_O}$. The two signals $L_O$ and $\overline{L_O}$ are introduced to the gate electrodes of respective field effect transistors FET1 and FET2, each of which may be of the type presently designated 2N4857A. The drain electrodes of the field effect transistors are grounded, and the source electrode of the field effect transistor FET1 is connected to the junction of the resistors R1 and R2.

The junction of the capacitor C2 and resistor R1 is connected through a 13 kilo-ohm resistor R4 and through a 499 ohm resistor R5 to the input terminal 3 of the integrated circuit. The source electrode of the field effect transistor FET2 is connected to the junction of the resistors R4 and R5. The resistor R5 is connected to a grounded 6.04 kilo-ohm resistor R6, the latter resistor being shunted by a 10,000 picofarad capacitor C3.

The terminal 7 of the integrated circuit is connected to the positive terminal of a 15-volt direct voltage source, and the terminal 4 is connected to the negative terminal of that source. The source terminals are connected to grounded 0.1 microfarad capacitors C4 and C5 respectively. The terminal 8 of the integrated circuit is coupled back to the terminal 11 through a 39 picofarad capacitor C6. The output of the integrated circuit 201 is connected back to the input terminal 2 through a 78.7 kilo-ohm resistor R7, the resistor being shunted by a 6,800 picofarad capacitor C7.

The 500 low-pass filters 124 and 130 may each take the form of the circuit shown in FIG. 6. The input terminal 300 of the circuit of FIG. 6 is connected through a 51.1 kilo-ohm resistor R10 to the input terminal 2 of an integrated circuit 302 which may be of the type presently designated LM201. The input terminal 3 of the integrated circuit 302 is connected to a grounded 26.4 kilo-ohm resistor R11, and the output terminal 6 is connected to the output terminal 304 of the circuit. The output terminal 6 is also connected back to the input terminal 2 through a 78.7 kilo-ohm resistor R12, the resistor being shunted by a 10,000 picofarad capacitor C10. The terminal 7 of the integrated circuit is connected to the positive terminal of the 15-volt source, and a capacitor C11 of 39 picofarads is intercoupled between the terminal 1 and the terminal 8.

The full-wave rectifiers 126 and 132 constitute linear connectors, and each may be formed of a circuit such as shown in FIG. 7. The circuit of FIG. 7 has an input terminal 400 which is coupled through a pair of polarized capacitors C12 and C13, each having a capacity of 6.8 microfarads. The capacitor C13 is connected to the input terminals 2 of an integrated circuit 402 of the type designated LM208 through a 12.1 kilo-ohm resistor R13. The input terminal 3 of the integrated circuit is connected to a grounded 30 kilo-ohm resistor R14. A 33 picofarad capacitor C14 intercouples the terminals 1 and 8 of the integrated circuit. The terminal 7 of the integrated circuit 402 is connected to the positive terminal of the 15-volt source, and the terminal 4 is connected to the negative terminal of that source. The source terminals are respectively connected to grounded 0.01 microfarad capacitors C15 and C16.

The output terminal 6 of the integrated circuit 402 is connected through a diode D2 and through a 22.1 kilo-ohm resistor R15 to the output terminal 404 of the circuit. The output terminal 404 is connected back through a 44.2 kilo-ohm resistor R16 to the junction of capacitor C13 and resistor R13. The junction of diode D2 and resistor R15 is connected back through a 12.1 kilo-ohm resistor R17 to the input terminal 2 of the integrated circuit. Finally, a diode D1 is interconnected between the output terminal 6 and the input terminal of the integrated circuit.

Figure 8:
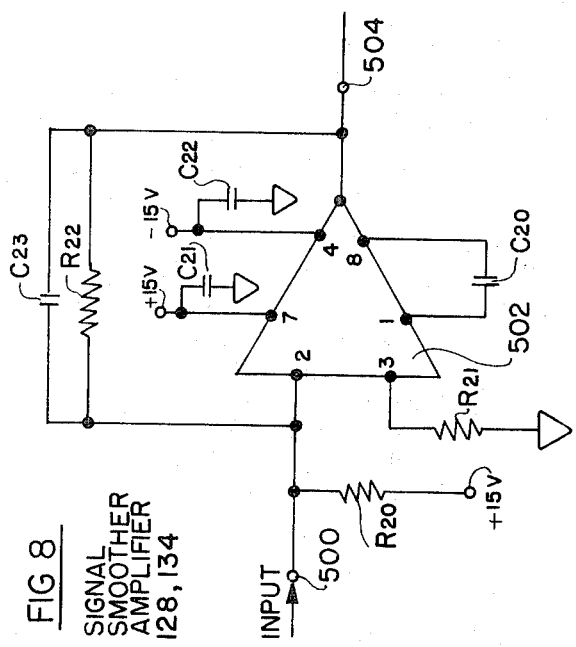

The two signal smoother amplifiers 128 and 134 may have the circuit shown in FIG. 8. The input terminal 500 of the circuit is connected to the input terminal 2 of an integrated circuit 502 which may be of the type presently designated LM201. The input terminal 2 is connected to the positive terminal of the 15-volt source through an appropriate bias resistor R20. The bias resistor R20 is of a selected value to subtract out background noise. The input terminal 3 of the integrated circuit is connected to a grounded 30 kilo-ohm resistor R21. A capacitor C20 intercouples the terminals 1 and 8 of the integrated circuit 502, and it may have a capacity of 33 picofarads. The terminal 7 of the integrated circuit is connected to the positive terminal of the 15-volt source, and the terminal 4 is connected to the negative terminal of the 15-volt source. The source terminals are connected to respective grounded 0.01 microfarad capacitors C21 and C22. The output terminal of the integrated circuit 502 is connected to an output terminal 504, and is connected back to the input terminal 2 through a 250 kilo-ohm resistor R22, which is shunted by a 1.0 microfarad capacitor C23.

Figure 9:
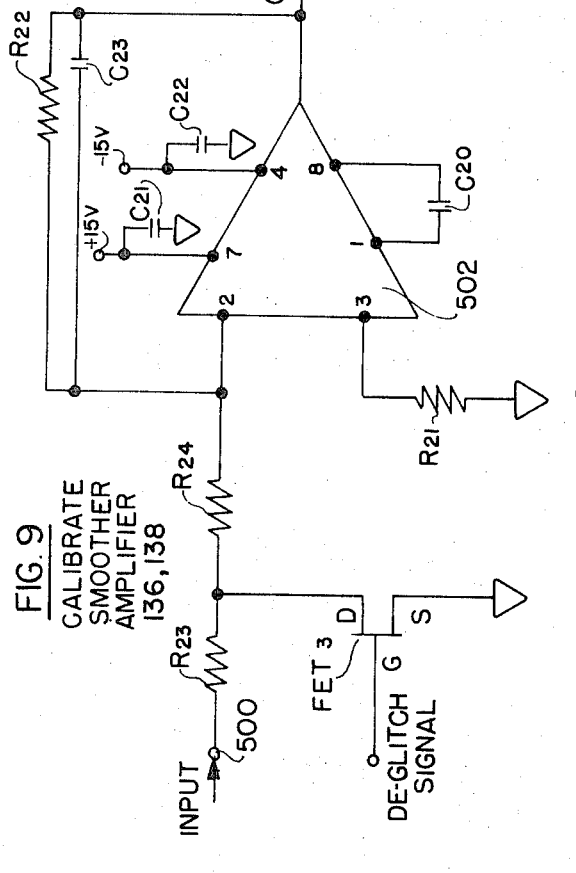

The two calibrate smoother amplifiers 136 and 138 may each have the circuitry shown in FIG. 9. The circuit of FIG. 9 is generally similar to the circuit of FIG. 8, and like elements have been designated by the same numbers. In the circuit of FIG. 9, however, the input terminal 500 is connected to the input terminal 2 of the integrated circuit 502 through a 3 kilo-ohm resistor R23 and through a 100 kilo-ohm resistor R24. The deglitching drive circuits 140 and 142 ground the calibrate smoother amplifier inputs for 2.13 milliseconds after beam switching for de-glitching, and, for that purpose, the de-glitch signal derived from the frequency tracker module 28 is applied to the gate electrode of a field effect transistor FET3, of the type presently designated 2N4857A. The source electrode of the field effect transistor is grounded, and the drain electrode is connected to the junction of the resistors R23 and R24.

Figure 10:
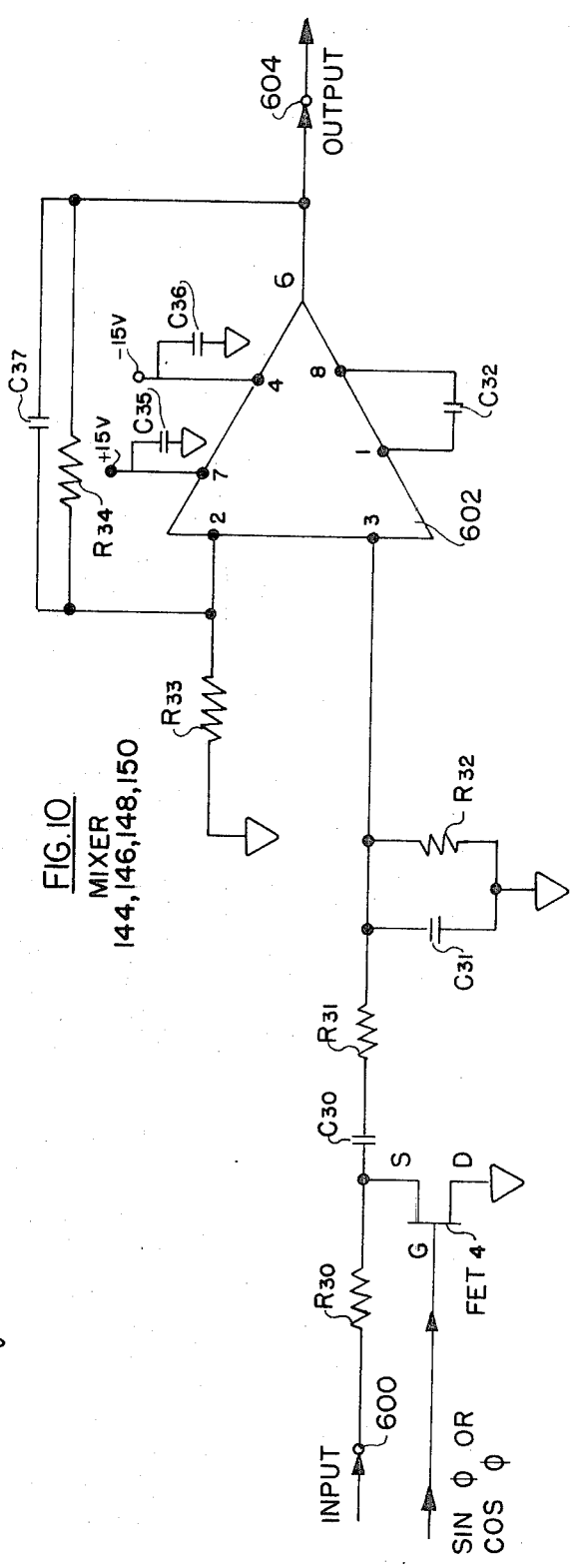

The mixer stages 144, 146, 148 and 150 of FIG. 4 may each be formed of a circuit, such as shown in FIG. 10. The circuit of FIG. 10 includes an input terminal 600 which is connected through a 3.0 kilo-ohm resistor R30 and through a 0.1 microfarad capacitor C30, and through a 90.9 kilo-ohm resistor R31 to the input terminal 3 of an integrated circuit 602 which may be of the type presently designated LM201H. The drain electrode of the field effect transistor FET4 is grounded, and the source electrode is connected to the junction of the resistor R30 and capacitor C30. The sine-cosine generator 152 in FIG. 4 receives an appropriate switching signal $\phi$ from the timer circuit of the system, and it develops sine $\phi$ and cos $\phi$ signals for the mixers, as shown in FIG. 4. The sine $\phi$ or cos $\phi$ signals are applied to the gate electrode of the field effect transistor FET4.

The input terminal 3 of the integrated circuit 602 is connected to a grounded 36.5 kilo-ohm resistor R32 which is shunted by a 10,000 microfarad capacitor C31. The terminals 1 and 8 of the integrated circuit are shunted by an 18 microfarad capacitor C32. The input terminal 2 of the integrated circuit is connected to a grounded 24.3 kilo-ohm resistor R33. The terminal 7 of the integrated circuit is connected to the positive terminal of the 15-volt source, and the terminal 4 is connected to the negative terminal of the 15-volt source. The source terminals are connected respectively to a pair of 0.01 microfarad grounded capacitors C35 and C36. The output terminal 6 of the integrated circuit is connected back to the input terminal 2 through a resistor R34 of 100 kilo-ohms, the resistor being shunted by a 1,500 microfarad capacitor C37. The output terminal 6 of the integrated circuit is connected to the output terminal 604 of the mixer. The mixers, for example, are driven at 467 Hz by the sine $\phi$ and cos $\phi$ signals.

The two low-pass filters 154 and 156 may each have a circuit, such as shown in FIG. 11. The first input terminal 700 of the low-pass filter is connected through a 3.32 kilo-ohm resistor R40, and through a 30.1 kilo-ohm resistor R42 to the input terminal 3 of an integrated circuit 702 of the type designated LM201H. The input terminal 704 of the low-pass filter, on the other hand, is connected through a resistor R43 of 3.32 kilo-ohms to the junction of resistors R40 and R42. The resistors R40 and R43 serve as summing resistors for the two inputs. The common junction of the resistors R40, R43 and R42 are connected to a grounded capacitor C40 of, for example, 0.05 microfarads.

The input terminal 3 of the integrated circuit 702 is also connected to a grounded resonant circuit 706 formed by an inductance coil L1 of 6 Henries, and which is shunted by a 30,000 microfarad capacitor C41. The input terminal 3 is also connected to a grounded 300 kilo-ohm resistor R44. The input terminal 2 of the integrated circuit 702 is connected to a grounded 150 kilo-ohm resistor R45. The output terminal 6 of the integrated circuit 702 is connected to an 8.25 kilo-ohm resistor R47 which, in turn, is coupled through a 0.05 microfarad capacitor C42 to the output terminal 706 of the circuit. The output terminal is connected to a series resonant circuit 708 formed of a 2,100 microfarad capacitor C43 and a grounded inductance coil L2 of 6 henries.

The output terminal 6 of the integrated circuit is connected back to the input terminal 2 through a 100 kilo-ohm resistor R49. The terminal 7 of the integrated circuit is connected to the positive terminal of the 15-volt source, and the terminal 4 is connected to the negative terminal of that source. The source terminals are connected to respective 0.01 microfarad grounded capacitors C44 and C45. An 18 microfarad capacitor C46 is connected to the terminals 1 and 8 of the integrated circuit.

The outputs from the low-pass filters 154 and 156 are applied to the respective input terminals 800 and 802 of the buffer and comparator 158, which is shown in circuit and logic detail in FIG. 12. The terminal 800 is connected to the input terminal 3 of an integrated circuit 804, which may be of the type designated LM201. The output terminal of the integrated circuit 804 is connected through a 3.3 kilo-ohm resistor R50 to the input terminal 2 of a second integrated circuit 810 of the type designated LM211H.

The input terminal 2 of the integrated circuit 810 is connected to a grounded 820 picofarad capacitor C51, and the output terminal is connected to the junction of a 100 picofarad capacitor C52 and to a resistor R55. The resistor R55 is connected to the positive terminal of a 5-volt source, and the capacitor C52 is connected back to the input terminal 2 of the integrated circuit. The terminal 1 of the integrated circuit 810 is grounded, and the terminal 4 is connected to the minus terminal of the 15-volt source. The terminal 8 is connected to the positive terminal of the 15-volt source.

The input circuit 2 of the integrated circuit 804 is connected to a 110 kilo-ohm grounded resistor R52, and the output terminal of the integrated circuit 804 is connected back to the input terminal through a 500 kilo-ohm potentiometer P1 and through a 20 kilo-ohm resistor R53. The input terminal 3 of the integrated circuit 804 is also connected to a grounded 300 kilo-ohm resistor R54. The terminal 7 of the integrated circuit 804 is connected to the positive terminal of the 15-volt source, and the terminal 4 is connected to the negative terminal of that source. A 27 picofarad capacitor C50 is intercoupled between the terminals 1 and 8 of the integrated circuit 804.

The input terminal 802 is connected to an integrated circuit 812 which may be of the same type as the integrated circuit 804, and which may be connected in the same manner. The integrated circuit 812 is connected to a further integrated circuit 814 which may be of the same type as the integrated circuit 810, and which may be connected in the same manner.

The outputs of the integrated circuits 810 and 814 are connected to a "nand" gate 820, and the altimeter gate signal appears at the output of the "nand" gate. The "nand" gate 820 may be an integrated circuit of the type presently designated SN7400N.

The integrated circuits 804 and 812 form buffer amplifiers, and the integrated circuits 810 and 814 form comparators. The two comparators 810 and 814 transform the sine waves from the buffer amplifiers into square waves, and the two square waves are inputted to the "nand" gate 820 to form the altitude or altimeter gate output.

The invention provides, therefore, an improved altimeter module for use in a frequency modulated continuous wave Doppler system. The improved module of the present invention uses J1 leakage for zero altitude calibration purposes, so as to eliminate the prior art circuitry required to generate the calibrate signal, and this also permits 100% duty cycle operation with respect to the velocity tracking module and the altimeter module thereby minimizing fluctuation errors and mode switching. The system of the invention, moreover, uses signal amplitudes to determine altitude, thereby obviating the need for remodulators and eliminating errors which arise in the prior art systems and which result from the injection of the remodulator keying frequency.

It will be appreciated that while a particular embodiment of the invention has been shown and described, modifications may be made. The following claims are intended to cover all modifications which come within the spirit and scope of the invention.

What is claimed is:

1. In a frequency-modulated continuous-wave aircraft Doppler radar navigational system, which includes a transmitter for transmitting a frequency-modulated continuous-wave signal, and a receiver for receiving the corresponding Doppler-shifted frequency-modulated continuous-wave echo signal including a leakage component ($J_1$); the combination of:

a post intermediate frequency circuit coupled to the receiving including sine-cosine demodulating means for eliminating the leakage component ($J_1$) and further including first and second filter means coupled to said demodulating means for rejecting the resulting zero speed leakage term;

a sine signal channel coupled to said first filter means and including a first rectifier for establishing a direct current analog of the demodulated sine signal from the demodulating means;

a cosine signal channel coupled to said second filter means and including a second rectifier for establishing a direct current analog of the demodulated cosine signal from the demodulator; and output circuitry coupled to the first and second rectifiers for producing a gate signal having a duration which is a measure of the altitude of the aircraft.

2. The combination defined in claim 1, and which includes a first mixer in said sine signal channel interposed between said first rectifier and said first filter means, and a second mixer in said cosine signal channel means, interposed between said second rectifier and said second filter means, said mixers serving to translate the center of the Doppler spectrum to direct current.

3. The combination defined in claim 1, and which includes low-pass filter means in said sine signal channel and in said cosine signal channel to filter out a major portion of the passband noise.

4. The combination defined in claim 1, and which includes first and second smoother amplifier means in the sine and cosine signal channels respectively coupled to the outputs of the first and second rectifiers.

5. The combination defined in claim 1, and which includes a sine calibrate channel connected to the output of the sine-cosine demodulating means for receiving the demodulated sine signal therefrom, and a cosine calibrate channel connected to the output of the sine-cosine demodulating means for receiving the demodulated cosine signal therefrom.

6. The combination defined in claim 5, and which includes first, second, third and fourth mixer means respectively coupling the sine and cosine signal channels and the sine and cosine calibrate channels to said output circuitry; and means for introducing signals to said last-named mixer means to establish a signal phase and a calibrate phase.

7. The combination defined in claim 6, in which said output circuitry includes a first summing network connected to the first and second mixture, and a second summing network connected to the third and fourth mixers.

8. The combination defined in claim 7, in which said output circuitry includes a buffer and comparator network coupled to the first and second summing networks.

9. The combination defined in claim 8, and which includes first and second filter networks respectively coupling the first and second summing networks to said buffer and comparator network.

* * * * *